US006845437B2

(12) United States Patent
Borman et al.

(10) Patent No.: US 6,845,437 B2
(45) Date of Patent: Jan. 18, 2005

(54) COMPUTER SYSTEM WITH HEAP AND CARD TABLE

(75) Inventors: Samuel David Borman, Southsea (GB); Andrew Dean Wharmby, Romsey (GB)

(73) Assignee: International Business Machines Corporation, Armonk, NY (US)

( * ) Notice: Subject to any disclaimer, the term of this patent is extended or adjusted under 35 U.S.C. 154(b) by 316 days.

(21) Appl. No.: 10/217,718

(22) Filed: Aug. 13, 2002

(65) Prior Publication Data

US 2003/0033498 A1 Feb. 13, 2003

(30) Foreign Application Priority Data

Aug. 13, 2001 (GB) .............................................. 0119684

(51) Int. Cl.[7] .............................................. G06F 12/00
(52) U.S. Cl. ...................... 711/173; 711/132; 711/159; 707/206
(58) Field of Search .............................. 711/6, 129, 132, 711/153, 159, 173, 206; 707/206

(56) References Cited

U.S. PATENT DOCUMENTS

| 5,845,298 | A |   | 12/1998 | O'Connor et al. | .......... 707/206 |
| 5,953,736 | A | * | 9/1999  | O'Connor et al. | ............. 711/6 |
| 6,098,089 | A |   | 8/2000  | O'Connor et al. | .......... 709/104 |
| 6,173,294 | B1 | * | 1/2001 | Azagury et al.  | ............ 707/206 |
| 6,185,581 | B1 |   | 2/2001 | Garthwaite      | .................. 707/206 |
| 6,249,793 | B1 | * | 6/2001 | Printezis et al. | ............ 707/206 |

OTHER PUBLICATIONS

"Parallel Garbage Collection for shared Memory Multiprocessors" by Flood, Detlefs, Shavit, Zhang, USENIX Java Virtual Machine Research & Technology Symposium, Apr. 23–24, 2001. California, USA.
"A Serially Reusable Java Virtual Machine Implementation for High Volume, Highly Reliable Transaction Processing", IBM Technical Report TR 29.3406, http://wwwidd.raleigh.ibm.com/.

* cited by examiner

Primary Examiner—Pierre M. Vital
(74) Attorney, Agent, or Firm—Jerry W. Herndon (57) ABSTRACT

A computer system has a heap for storing objects and a card table for tracking updates to objects on the heap, typically for garbage collection purposes. In particular, the heap is divided into segments, each corresponding to a card in the card table, and any update to a segment in the heap triggers a write barrier to mark the corresponding card in the card table. It is important that this write barrier is as efficient as possible to optimize system performance. In some circumstances an object update may be made to an address outside the heap. To ensure that this still properly maps to a card in the card table, the entire memory space is folded cyclically, so that any given memory address corresponds to one, and only one card, in the card table.

27 Claims, 7 Drawing Sheets

PRIOR ART

COMPUTER SYSTEM WITH HEAP AND CARD TABLE

FIELD OF THE INVENTION

The present invention relates to a computer system having a heap for storing objects, and a card table to keep track of updates to objects on the heap, and in particular to the way in which the heap is mapped to the card table.

BACKGROUND OF THE INVENTION

In the Java programming environment (Java is a trademark of Sun Microsystems Inc.), programs are generally run on a virtual machine, rather than directly on hardware. Thus a Java program is typically compiled into byte-code form, and then interpreted by the Java virtual machine (VM) into hardware commands for the platform on which the Java VM is executing. The Java environment is further described in many books, for example "Exploring Java" by Niemeyer and Peck, O'Reilly & Associates, 1996, USA, "Java Virtual Machine", by Meyer and Downing, O'Reilly & Associates, 1997, USA, and "The Java Virtual Machine Specification" by Lindholm and Yellin, Addison-Wedley, 1997, USA.

Java is an object-oriented language. Thus a Java program is formed from a set of class files having methods that represent sequences of instructions. One Java object can call a method in another Java object. A hierarchy of classes can be defined, with each class inheriting properties (including methods) from those classes that are above it in the hierarchy. For any given class in the hierarchy, its descendants (i.e. below it) are called subclasses, while its ancestors (i.e. above it) are called superclasses. At run-time classes are loaded into the Java VM by one or more class loaders, which are themselves organised into a hierarchy. Objects can then be created as instantiations of these class files, and indeed the class files themselves are effectively loaded as objects. The Java VM includes a heap, which is a memory structure used to store these objects.

Once a program has finished with an object stored on the heap, the object can be deleted to free up space for other objects. In the Java environment, this deletion is performed automatically by a system garbage collector (GC). This scans the heap for objects that are no longer referenced, and hence are available for deletion. Note that the precise form of GC is not prescribed by the Java VM specification, and many different implementations are possible.

Some implementations of the Java VM incorporate a card table as an adjunct to the heap. The card table comprises a set of cards, each of which corresponds to a fixed chunk of the heap (say 512 bytes). The card effectively acts as a flag to indicate the status of the corresponding portion of memory, in particular the card or flag is typically set when a pointer is written into the corresponding portion of memory. The card table is therefore used to keep track of changes to the heap.

There are a variety of circumstances for wanting to utilize a card table, mostly connected with GC. For example, some known forms of GC are based on the fact that the longer an object has survived already, then generally the longer it will survive in the future. Consequently, the heap is split into two components or generations; one having newly created or young objects, the other having older objects. In this approach, it is efficient to perform GC more frequently on the young heap than the old heap, since the hit rate (of deletions) is likely to be higher for the young heap. However, it is important not to GC an object from the young heap while it is still being referenced from the old heap (such a reference can be termed a cross-heap pointer); otherwise such reference would be invalid after the GC.

Nevertheless, it is undesirable to have to scan the whole of the old heap for possible cross-heap pointers, since this is time-consuming. This problem can be alleviated by use of the card table. Thus, when a GC is performed of the young heap, any cards in the card table are identified that correspond to the old heap portion of memory, and that have been set. These cards indicate the only portions of the old heap that could possibly have a cross-heap pointer, and so only these portions need to be scanned for a cross-heap pointer, rather than the whole heap (note that simply because a card is set does not mean that there is necessarily still a cross-heap reference in the corresponding portion of memory, for example this pointer may have been subsequently nulled; in addition some implementations may mark the relevant card when any reference is written to the heap, deferring until later any checks as to whether the reference is a potentially problematic cross-heap reference, or simply a harmless reference to some local object).

If any cross-heap pointers are identified at this stage, then the referenced objects in the young heap are typically transferred ("promoted") to the old heap. This then allows the card table to be reset, since it is known that there are currently no cross-heap pointers, and the young portion of the heap can be garbage collected.

Another (related) use of card tables is in mostly concurrent garbage collectors. Thus conventional GC strategies typically involve stopping all threads to determine references between objects, but clearly this has a significant impact on system performance. A mostly concurrent garbage collector effectively stops one thread at a time to look at its memory usage. However, it is more difficult in this situation to determine the overall representation of references, because while one thread has stopped, other threads are potentially updating references. The card table can be used to track these updated references, effectively identifying those portions of the heap that must be double-checked before GC can be finalised.

The prior art contains many documents concerning the use of card tables in generational or mostly concurrent garbage collectors, see for example: U.S. Pat. Nos. 5,953,736, 5,845,298, 6,098,089, 6,173,294, 6,185,581, 6,249,793; "A Generational Mostly-concurrent Garbage Collector" by Tony Printezis and David Detlefs, presented at the International Symposium on Memory Management, Oct. 15–16, 2000, Minnesota, USA, (SIGPLAN Not. (USA), Vol. 36/1, January 2001, p143–154), and "Parallel Garbage Collection for Shared Memory Multiprocessors" by Flood, Detlefs, Shavit, Zhang, presented at USENIX Java Virtual Machine Research and Technology Symposium, Apr. 23–24, 2001, California, USA.

Another situation in which card tables are used is in relation to the IBM product: CICS Transaction Server for z/OS Version 2 Release 1. This incorporates a Java VM that is specially designed to be reusable for running successive transactions on the same VM. One of the ways in which this is implemented is by splitting the heap into two components, a transient portion and a persistent component. The former contains objects specific to a particular transaction, and is deleted at the end of the transaction (known as reset); the latter contains middleware objects that effectively provide the transaction processing environment, and so survive from one transaction to another.

To be able to delete the transient heap at the end of a transaction, it is necessary to ensure that there are no cross-heap pointers (from the persistent heap to the transient heap). Again, a card table is used to track pointer updates to the heap. At reset, only those portions of the persistent heap whose corresponding card has been marked need to be checked for cross-heap pointers. Further details about the use of a card table for a reusable VM can be found in: "A Serially Reusable Java Virtual Machine Implementation for High Volume, Highly Reliable Transaction Processing", IBM Technical Report TR 29.3406, available from the location tlg/tr.nsf/TRbyNumber at http://wwwidd.raleigh.ibm.com/.

In all instances where a card table is used, the setting of a card is performed by a write barrier—i.e. a piece of code that is invoked whenever a reference is written to the heap. It is important that write barriers are extremely efficient pieces of code, since they can be called many times. It is therefore generally desirable to optimize the work of the write barrier for marking the card as much as possible.

One piece of processing that the write barrier must perform is to map from the heap address that is being updated to the corresponding card location, so that the correct card can be set. Thus a traditional card marking scheme works by mapping areas of memory (segments) of a defined address range, the heap, to cards within the card table, where a card represents a segment within the heap. Typically this mapping can be performed in an efficient manner by calculating an index into the card table by determining the offset of the address into the heap (i.e by subtracting the base address of the heap), and then dividing that result by the size of the chunk of memory (segment size) corresponding to a single card.

More particularly, for a heap of a given size we can calculate the required number of cards in the card table T required as follows: T=((heap top−heap base)/segment size). The index of the card C that represents a given address X can then easily be calculated as follows: C=(X−address(heap base))/segment size. The reverse algorithm, to map a card index to the heap address of a segment is: X=(C*segment size)+address(heap base).

However, the heap does not represent the full extent of memory. In some situations, described in more detail below, a heap updating program might actually update a stack or a heap, and not know when it is doing each. An update to the stack is to an address outside of the heap. If the system tries to map an address outside the heap into the card table, the index calculated using the above formulae will be outside the card table. Thus the above algorithm only works provided "X" is guaranteed to be within the heap (i.e. heap base=<X<=heap top). If we apply this algorithm to an address outside the heap we will calculate a card index outside the bounds of the card table and storage violations/addressing exceptions will result.

In situations where it is not possible to guarantee that the address X is always within a defined address range of the heap, the problem could be solved in a number of ways. One possibility is to make the card table big enough to map the whole addressing range and then check, for example, only those portions of the card table that correspond to the heap (and possibly the stack) for possible updates. Although this is simple in principle to implement, and certainly feasible on a 32 bit system, it becomes problematic on a 64 bit system because of the size of card table required to reflect the increased address space. An alternative approach is to add range checks to the algorithm, to ensure that an address is within the heap before calculating the card index. Again this is relatively straightforward to implement (providing the heap limits are known). However, it does have the significant drawback of significantly increasing the path length of the write barrier, and therefore having a detrimental effect on overall performance. Because administration of a heap and especially garbage collecting of a heap is so important to system performance, it is important to find improved administration algorithms.

SUMMARY OF THE INVENTION

Accordingly, the invention provides a method of operating a computer system having a memory, a portion of which is allocated to a heap for storing objects, said method comprising the steps of:

providing a card table comprising a set of N cards;

dividing the entire memory into M segments, where M>N;

assigning each of the M segments to a corresponding one of said N cards, wherein at least one of said cards has multiple memory segments assigned to it; and marking a card to indicate an update to one of the one or more memory segments that correspond to it.

In this way, the whole of memory is mapped to the card table, rather than just the portion of memory corresponding to the heap, as in most prior art arrangements. This ensures that any given memory address corresponds to a valid card index. To contain the size of the card table, multiple memory segments are mapped to a single card. This arrangement leads to an more efficient mechanism to administer a heap involving only simple logical "ands" and bit shifts. Usually, only updates to the heap are reflected in the card table, the mapping of the entire memory to the card table being irrelevant. However, since the algorithm maps all of memory to the card table, the arrangement eliminates the need for range checks in situations in which a heap updating program can sometime update a stack as an alternative to a heap. In such situations, the card table will imply an update to the heap, when in fact it may have been a stack update. But, for example, that merely causes a garbage collection routine to waste a small amount of time later when looking for an heap update that is not there.

To mark a card, it is necessary to map from the address being updated to the corresponding card. In the preferred embodiment, the mth memory segment (0=<m=<M−1) is mapped to the kth card, where k=m mod N (mod is the modulus operator). This provides a straightforward cyclic mapping of memory space onto the card table, effectively dividing memory into successive folds, each containing the same number of segments as there are cards in the card table. To improve efficiency of this mapping, it is preferred that N and M are both powers of 2, since this allows the mapping from m to k to be performed using only logical AND and bit shift operations. The path length of this mapping is now very small, which is important, since the card update is a write barrier and therefore very sensitive for performance.

Since multiple memory segments can map to one card, it is no longer possible to uniquely map back from such a card to a particular memory segment. However, in practice this turns out not to be a problem. Thus in the preferred embodiment, the heap comprises N or fewer memory segments, and so can be contained within a single fold. The only object updates of interest in many circumstances (particularly for garbage collection) are those to the heap. Providing the heap is no bigger than a single fold, then there is only one heap segment corresponding to a given card. Thus for any marked card, the heap segment to reviewed by the garbage collection process can be determined unambiguously.

In other words, the marked card table is typically used in garbage collection to identify segments containing objects that have potentially been updated. If a marked card has multiple memory segments assigned to it, then in principle all of these memory segments should be regarded as having been potentially updated. However, typically only those memory segments that are allocated to the heap are regarded as having been potentially updated, since these are the only ones of interest to the GC process.

In the preferred embodiment, the computer system further comprises a stack, which is also used for storing objects for performance reasons. There is no need, given the garbage collection implementation in this embodiment, to mark objects updated on the stack. However, in general, the code making updates to an object does not know whether the object is on the stack or the heap; it therefore assumes that the card is indeed on the heap (at least potentially so), and so marks the corresponding card. The only consequence of this is that the heap segment (if any) corresponding to this card will be scanned at the next GC, but this scan should prove negative if the card was only marked because of a stack update. In these circumstances the scan has been performed unnecessarily (a small performance hit), but there are no other negative consequences.

The invention further provides a computer system comprising:

a memory, a portion of which is allocated to a heap for storing objects, the entire memory being divided into M segments;

a card table comprising a set of N cards, wherein M>N, each of the M segments being assigned to a corresponding one of said N cards, so that at least one of said cards has multiple memory segments assigned to it; and a write barrier for marking a card to indicate an update to one of the one or more memory segments that correspond to it.

The invention further provides a computer program product comprising instructions encoded on a computer readable medium for causing a computer to perform the methods described above. A suitable computer readable medium may be a DVD or computer disk, or the instructions may be encoded in a signal transmitted over a network from a server. These instructions can then be loaded into memory (e.g. RAM) of a computer system, for execution by a processor to implement the relevant methods. It will be appreciated that the computer system and program product of the invention will generally benefit from the same preferred features as the method of the invention.

BRIEF DESCRIPTION OF THE DRAWINGS

A preferred embodiment of the invention will now be described in detail by way of example only with reference to the following drawings.

DETAILED DESCRIPTION OF A PREFERRED EMBODIMENT

Figure 1:
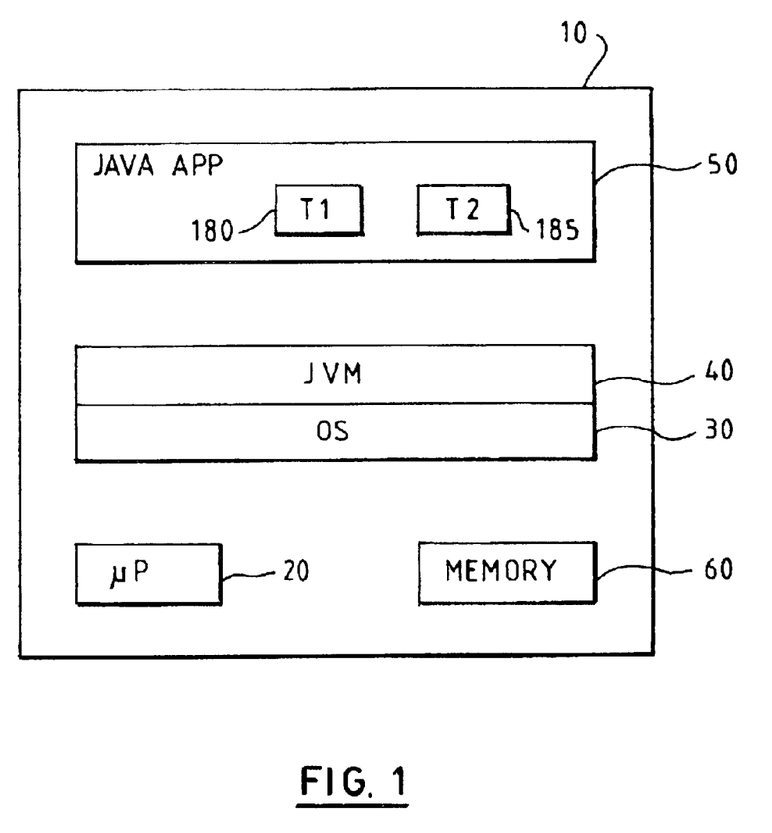
FIG. 1 is a schematic drawing of a computer system supporting a Java virtual machine (VM)

FIG. 1 illustrates a computer system 10 including a (micro)processor 20 that is used to run software loaded into memory 60. The software can be loaded into the memory by various means (not shown), for example from a removable storage device such as a floppy disk or CD ROM, or over a network such as a local area network (LAN) or telephone/modem (wired or wireless) connection, typically via a hard disk drive (also not shown). Computer system 10 runs an operating system (OS) 30, on top of which is provided a Java virtual machine (VM) 40. The Java VM 40 looks like an application to the (native) OS 30, but in fact functions itself as a virtual operating system, supporting Java application 50, which potentially includes multiple threads, e.g. T1 180 and T2 185.

It will be appreciated that computer system 10 can be a standard personal computer or workstation, minicomputer, mainframe, palmtop, or any other suitable computing device, and will typically include many other components (not shown) such as display screen, keyboard, sound card, network adapter card, etc. that are not directly relevant to an understanding of the present invention. Note that computer system 10 may also be an embedded system, such as a set top box, or any other hardware device including a processor 20 and control software 30, 40.

Figure 2:
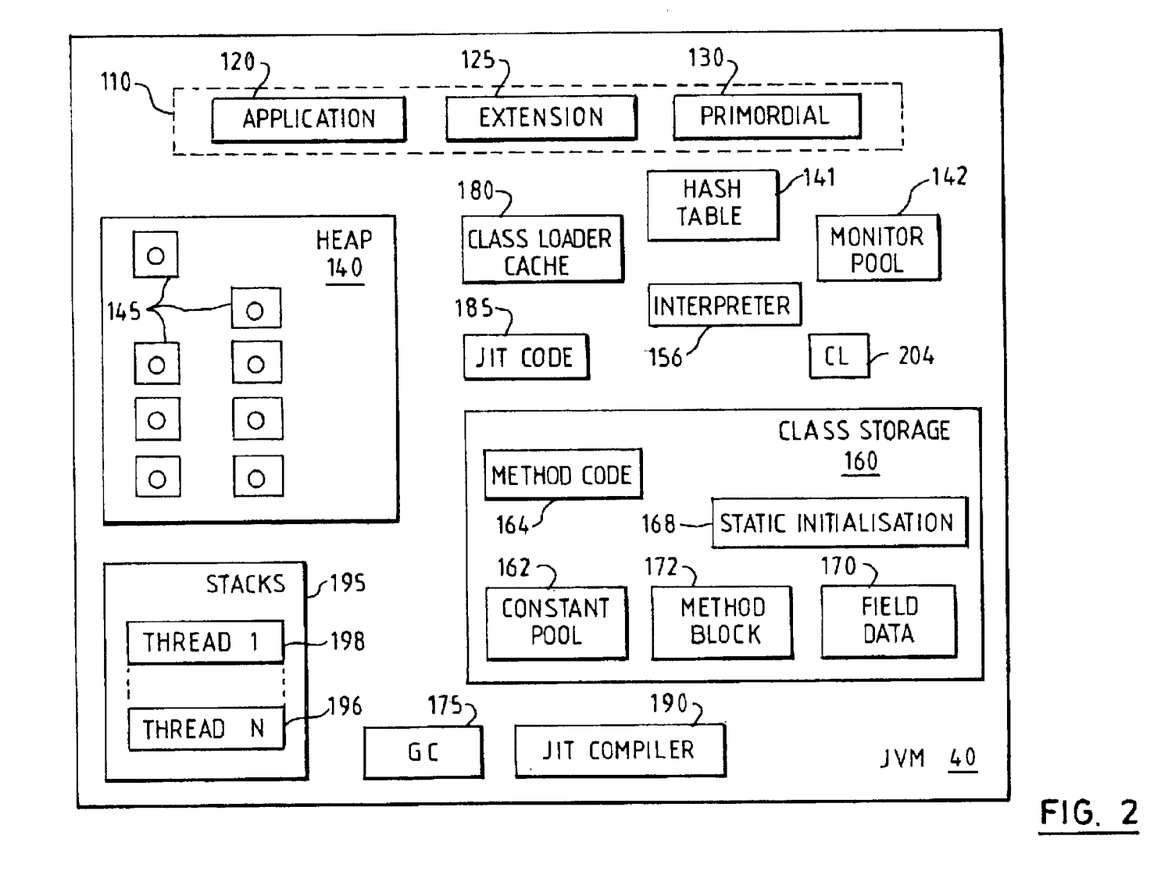
FIG. 2 is a schematic drawing showing the Java VM in more detail.

FIG. 2 shows the structure of Java VM 40 in more detail (omitting some components that are not directly pertinent to an understanding of the present invention). The fundamental unit of a Java program is the class, and thus to run any application the Java VM must first load the classes forming and required by that application. For this purpose the Java VM includes a hierarchy of class loaders 110, which conventionally includes three particular class loaders, named Application 120, Extension 125, and Primordial 130. The Java VM further includes a component CL 204, which also represents a class loader unit, but at a lower level. In other words, this is the component that actually interacts with the operating system to perform the class loading on behalf of the different (Java) class loaders 110.

Also present in the Java VM is a heap 140 that is used for storage of objects 145. Each loaded class represents an object and therefore can be found on the heap. In Java, a class effectively defines a type of object and this is then instantiated one or more times to utilize the object. Each such instance is itself an object that can be found in heap 140. Thus the objects 145 shown in the heap in FIG. 2 may represent class objects or other object instances. (Note that strictly the class loaders as objects are also stored on heap 140, although for the sake of clarity they are shown separately in FIG. 2).

The Java VM also includes a class storage area 160 that is used for storing information relating to the class files stored as objects in the heap 140. This area includes the method code region 164 for storing byte code for implementing class method calls, and a constant pool 162 for storing strings and other constants associated with a class. The class storage area also includes a field data region 170 for sharing static variables (static in this case implies belonging to the class rather than individual instances of the class, or, to put this another way, shared between all instances of a class), and an area 168 for storing static initialisation methods and other specialised methods (separate from the main method code 164). The class storage area further includes a method block area 172 that is used to store information relating to the code, such as invokers, and a pointer to the code, which may for example be in method code area 164, in JIT code area 185 (as described in more detail below), or loaded as native code such as C, for example as a dynamic link library (DLL).

Classes stored as objects 145 in the heap 140 contain a reference to their associated data such as method byte code etc. in class storage area 160. They also contain a reference to the class loader that loaded them into the heap, plus other fields such as a flag (not shown) to indicate whether or not they have been initialised. Associated with heap 140 is a card table (not shown in FIG. 2), as will be discussed in more detail later.

FIG. 2 further shows a monitor pool 142. This contains a set of locks (monitors) that are used to control access to an object by different threads. Thus when a thread requires exclusive access to an object, it first obtains ownership of its corresponding monitor. Each monitor can maintain a queue of threads waiting for access to any particular object. Hash table 141 is used to map from an object in the heap to its associated monitor.

Another component of the Java VM is the interpreter 156, which is responsible for reading in Java byte code from loaded classes and converting this into machine instructions for the relevant platform. From the perspective of a Java application, the interpreter effectively simulates the operation of a processor for the virtual machine.

Also included within the Java VM are class loader cache 180 and garbage collection (GC) unit 175. The former is a table used to allow a class loader to trace those classes that it initially loaded into the Java VM. The class loader cache therefore permits each class loader to check whether it has loaded a particular class. Note also that it is part of the overall security policy of the Java VM that classes will typically have different levels of permission within the system based on the identity of the class loader by which they were originally loaded. Garbage collection (GC) facility 175 is used to delete objects from heap 140 when those objects are no longer required.

The Java VM further includes a just-in-time (JIT) compiler 190. This forms machine code to run directly on the native platform by a compilation process from the class files. The machine code is created typically when the application program is started up or when some other usage criterion is met, and is then stored for future use. This improves run-time performance by avoiding the need for this code to be interpreted later (perhaps repeatedly) by the interpreter 156.

Another component of the Java VM is the stack area 195, which is used for storing the stacks 196, 198 associated with the execution of different threads on the Java VM. Note that because the system libraries and indeed parts of the Java VM itself are written in Java, and these frequently use multi-threading, the Java VM may be supporting multiple threads even if the user application 50 in FIG. 1 running on top of the Java VM contains only a single thread itself.

It will be appreciated of course that FIG. 2 is simplified, and omits many components not directly relevant to an understanding of the present invention. Thus for example, the heap may contain thousands of Java objects to run Java application 50, and the Java VM typically contains many other units (not shown) such as diagnostic facilities, etc.

Figure 3:
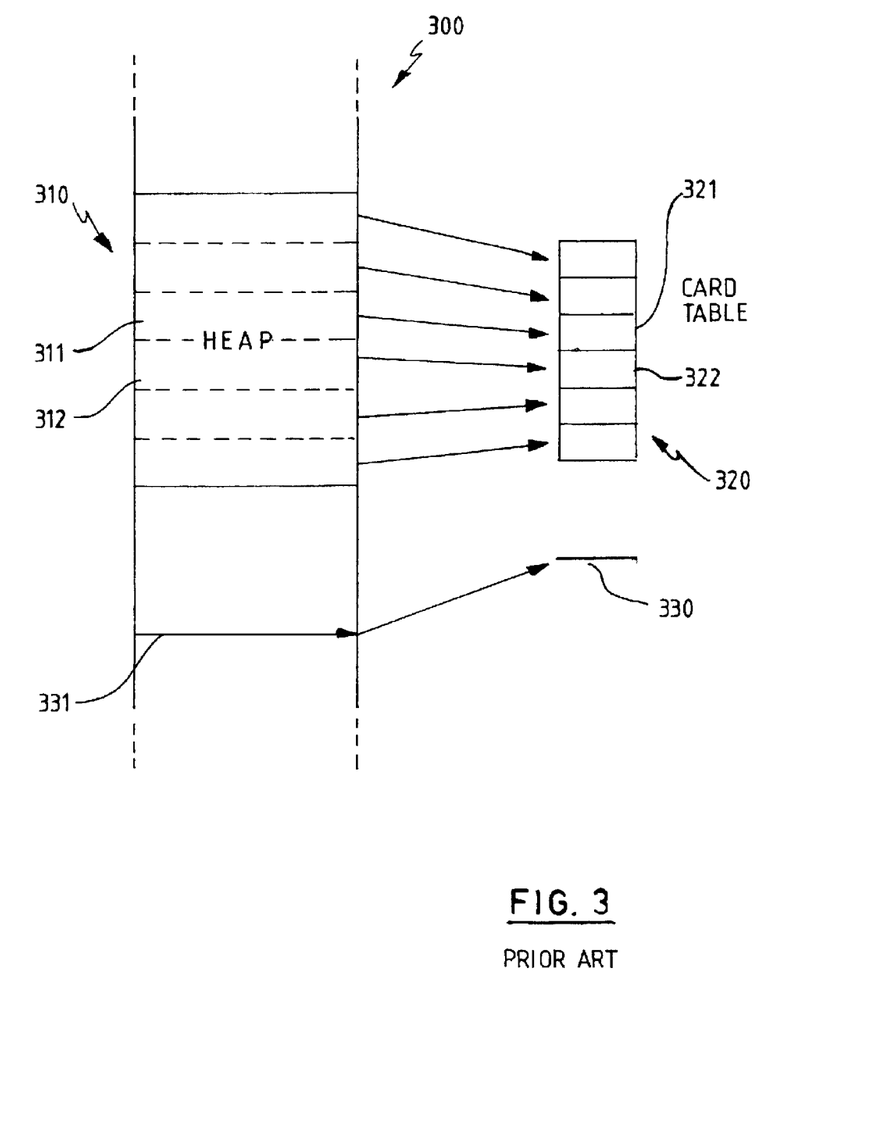
FIG. 3 illustrates the prior art mapping of a heap to the card table.

FIG. 3 illustrates the conventional mapping between the heap 310 (or other predefined area of memory 300) and the card table 320. Thus heap 310 is divided into segments 311, 312, each of which maps to a corresponding card 321, 322 in the card table. In operation, card 321 is marked if a reference in heap segment 311 is updated and card 322 is marked if a reference in heap segment 312 is updated. In practice, the heap would contain far more than six segments, and the card table would be correspondingly larger; however all the Figures herein show significantly reduced numbers of segments etc. for greater clarity.

FIG. 3 also illustrates what would happen in the prior art should an attempt be made to map an address 331 outside the heap. This would lead to a supposedly corresponding card 330, but this would in fact be outside card table 320, in other words, actually non-existent, and thereby lead to some access violation.

In practice, this has not been a problem in the prior art because all reference addresses to be mapped have indeed been located on the heap 310, rather than outside the heap (such as address 331). However, some new JIT compiler technology, known as escape analysis, can lead to objects being stored on the stack 195 (see FIG. 2). In particular, if the JIT can determine that an object is only referenced in a very limited fashion, then the object can be stored on the stack instead of the heap. The advantage of doing this is that the object is then automatically deleted when the stack frame is removed, without needing to use the garbage collection. (For more details on using escape analysis to see if Java objects can be allocated to the stack see: "Escape Analysis for Java", by Choi et al, Proceedings of the Conference on Object-Oriented Programming Systems, Languages, and Applications, OOPSLA, v34 n10 October 1999, ACM, New York, USA p1–19).

The problem with this approach however is that JIT code is unable, when writing to an address, to easily determine whether it is writing to the heap or to the stack. Therefore, the write barrier employed to mark the card table will operate on both occasions. This is fine for when the object is on the heap. However, if the object is on the stack, corresponding for example to memory address 331 (see FIG. 3), then this can lead to the problems illustrated, whereby the card to be updated (330) does not exist.

As previously mentioned, one way to try to overcome this problem would be by making the card table big enough to map the whole address range. However, this would require a very large card table (particularly on a 64 bit system). For Example, the preferred embodiment maps segments of 512 bytes into one bit of the card table. In a 32 bit addressing system with an addressing range of 4 G you would need a card table of 4 G/512, or approximately 8 MB. Alternatively, it would be feasible to add range checks to the JIT code so that it checked that the address that it was processing really was located in the heap. Thus if an address were determined to lie outside the heap, then the system would know not to try to update the card table. However, this approach results in extra path length in the write barrier code for the card table, and also a larger footprint for the JIT compiled code (it also requires the JIT code to be able to determine the heap boundaries).

Figure 4:
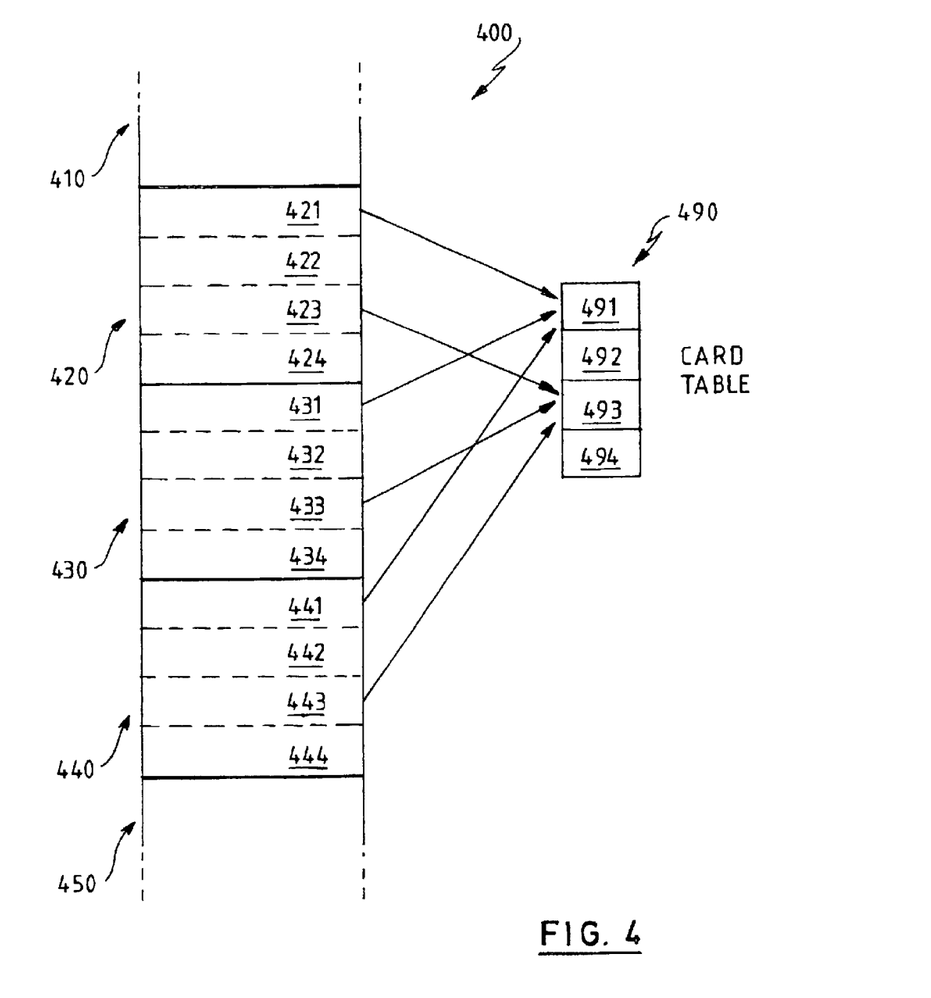
FIG. 4 illustrates the mapping between memory and the card table in accordance with the present invention.

FIG. 4 illustrates the solution provided by the preferred embodiment of the present invention. This shows memory 400 divided into segments 421, 422, . . . 444. Each segment maps to a card 491, 492, 493, 494 in the card table 490. Only one group of segments, say group 420, corresponding to cards 491, 492, 493 and 494 is the real heap. However, because the number of cards in the card table is less than the total number of memory segments, the mapping from segment to card is cyclic. Thus a first group of segments 420 span the card table, and then a second group 430, and then a third group 440 also span the card table. Consequently, card 491 is mapped to by segments 421, 431, and 441, while card 493 is mapped to by segments 423, 433, and 443. The groups of segments 420, 430, and 440 can be termed "folds". The use of folds allows a memory space of arbitrary size to be mapped to a card table of limited size, without requiring range checks or other relatively complex operations.

Mathematically, the mapping shown in FIG. 4 can be achieved by:

$$c = (X \% \text{ fold size})/\text{segment size} \quad (1)$$

Here X is the address to be mapped, C is the number of the corresponding card in the card table (assuming that they are numbered sequentially from 0), and "%" is the modulus operation.

The mapping of equation (1) successfully maps any address to the card table, while avoiding the need for any range checks or making the card table significantly bigger. One consequence of this mapping however is that multiple addresses within the addressing range will map to the same card and any code that processes the card table will need to be aware of this. The consequences of this will be discussed in more detail below.

Although the mapping of equation (1) does not waste storage or require expensive range checks, it does use the division and modulus operators. These are relatively expensive in processing terms, and indeed not all programming languages define a modulus operator (so that a more complex functional equivalent must be utilized). Since the performance of a write barrier is so important, the preferred embodiment of the present invention therefore adopts a modification of equation (1). In particular, this modification relies upon the fact that for any 2 binary numbers a and b:

$$a \% b == a \& (b-1), \text{ provided } b \text{ is an exact power of 2;}$$

$$a/b == a >> \log_2 b, \text{ provided } b \text{ is an exact power of 2.}$$

In these equations, % means modulus, & means a logical "and" and >> means a bit shift operation.

Thus in the preferred embodiment, the segment size and the fold size are both chosen to be powers of 2 (that implies that the number of cards in the card table is a power of 2 also). This then allows equation (1) to be rewritten as:

$$C = ((X \& (\text{fold size} - 1)) >> \log_2 \text{ segment size}) \quad (2)$$

As the fold size and segment size are constant we can calculate the values of (fold size −1) (=fold mask) and (log₂ segment size) (=card shift) up front, to save having to recalculate every time we need to calculate a card index. So in its simplest form the algorithm becomes:

$$C = ((X \& (\text{fold mask})) >> \text{card shift}) \quad (3)$$

Turning now to the relationship between heap size and fold size, in the preferred embodiment, the fold size is larger than the heap, since this ensures that each card corresponds to only a single segment in the heap, as discussed in more detail below. More particularly, the fold size is the smallest power of 2 that is larger than the heap, since this in turn minimises the size of the card table.

Figure 5:
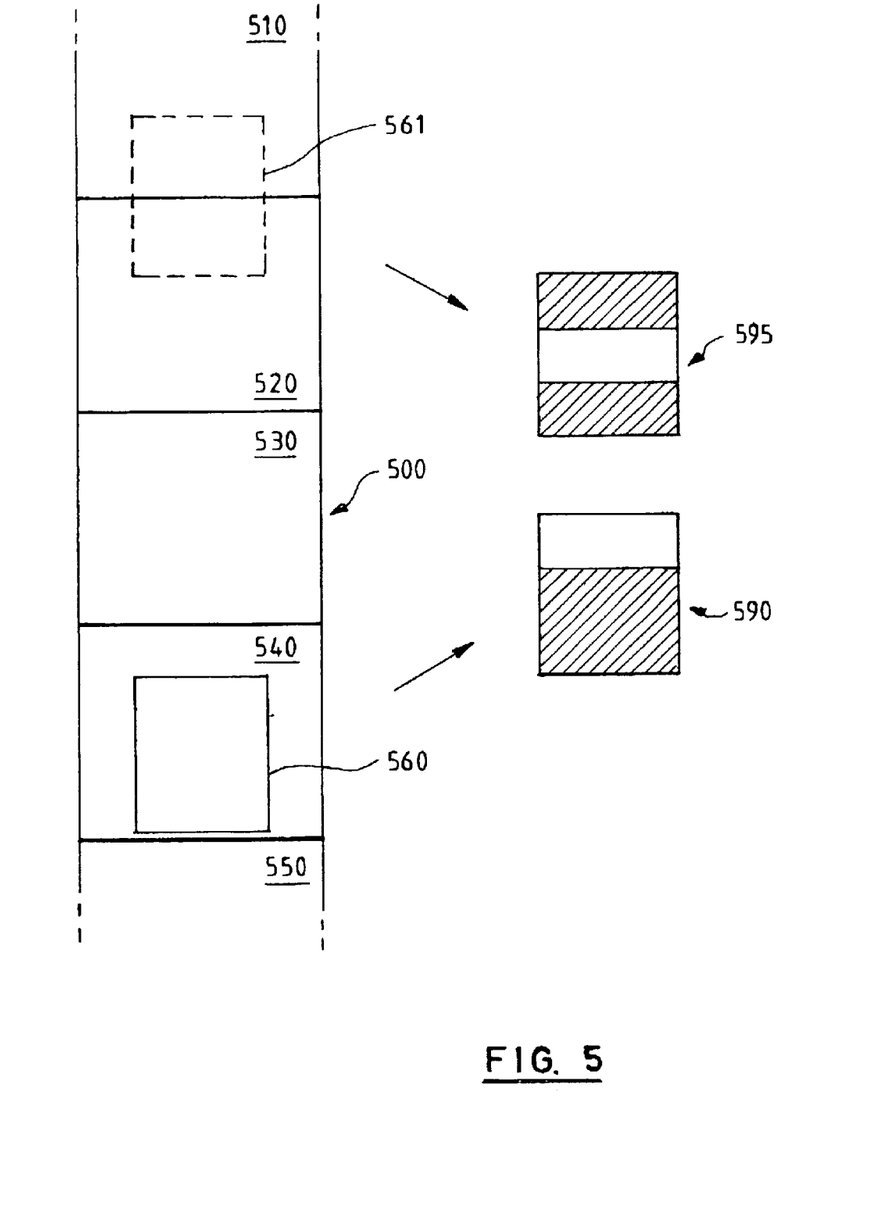
FIGS. 5 and 6 illustrate the relationship between the heap and "folds" in the memory mapping in accordance with the present invention.

This situation is shown in FIG. 5, which depicts part of main memory divided into five folds 510, 520, 530, 540, and 550 in memory 500. That part of main memory assigned to the heap is shown as 560 in fold 540, and the area of the card table 590 corresponding to the heap is shown hatched. Note that if the fold size were much bigger than the heap size, then the hatched portion of the card table would become relatively small. This is generally not desirable because for a given size card table, it is providing relatively little granularity of information about events in the heap (i.e. the heap itself would be represented by a rather small proportion of the total number of cards in the card table, which in turn would limit the overall effectiveness of the card table).

It will be appreciated that with this new algorithm, the card table becomes cyclic in nature, i.e. for any 2 addresses x and y within the heap, where x>y, the card index for x could be greater or less than the card index of y. An example of this is shown in FIG. 5, where dashed box 561 represents an alternative location of the heap. This in turn corresponds to the hatched card table locations shown in card table 595. Note that the addresses at the top of fold 520 map to the bottom of the card table, while addresses at the bottom of fold 510 map to the top of the card table (assuming that heap addresses increase from fold 510 to 520, etc.). If this is a problem (i.e. it is preferred for heap address to map linearly to card index), then this can be accomplished relatively easily by replacing X in equation (3) by X', where X'=X−heap base address (or other suitable offset value). The effect of this is to align the start of the card table with the base of the heap.

If we now look at mapping a card index back to the address of a heap segment, this can be achieved by applying similar techniques to those described above. The key to the reverse mapping is knowing to which card the heap base maps. For a card table of S cards, if we know that the address of the heap base (the first segment of heap) maps to card index I, then we can easily deduce that:

Card[I]→segment[1]
Card[I+1]→segment[2]
card[I+2]→segment[3]
card[I+n]→segment[n+1]
Card[S]→segment[(S−I)]
Card[0]→segment[(S−I+1)] etc.

From this, we can derive the reverse mapping from card index to heap address as follows:

$$X = \text{heap base} + (((C + (S-I)) \% S) * \text{segment size}) \quad (4)$$

Note that we are effectively assuming here that the heap size is equal to the fold size. If instead the heap size is less than the fold size, then cards that map to a large offset from the heap base will not actually correspond to the heap at all (in the context of FIG. 5, these would represent the unhatched portion of card table 590).

As the fold size and segment size are exact powers of 2, then S will also be an exact power of 2. Therefore, equation (4) can be rewritten to obtain the reverse mapping as follows:

$$X = \text{heap base} + (((C + (S-I)) \& (S-1)) >> \log_2 \text{ segment size}) \quad (5)$$

Again as the value of S, I and segment size are constant we can calculate the values of (S−I), (S−1) and (log₂ segment size) upfront to improve efficiency.

As previously mentioned, the approach described herein maps multiple memory addresses to the same card value. This turns out not to be a problem because of the way in which the card table is used. Thus for a start, in many cases it is known that only heap updates will mark a card (as opposed to updates elsewhere in memory). Therefore, since the above expression uniquely identifies a heap segment corresponding to a given card (assuming that the heap size is no larger than the fold size), then it is possible to determine which heap segment was updated to result in marking of a particular card. Even if some updates to other regions of memory (such as JIT updates to the stack) can also mark a card, then this is not necessarily important. Thus in the preferred embodiment, references from objects located on the stack are not important for GC purposes (which is one reason why they could be put on the stack in the first place). Accordingly, there is no need to specifically track card table updates from the stack (even though for performance reasons they may still mark the card table). Consequently, if any marked cards are found that do not correspond to a heap segment (i.e. the non-hatched portions of card table 590 or 595 in FIG. 5), then these can be ignored, since they must have been marked by operations that are of not relevant in the present situation.

Of course, when reviewing the card table, the policy is to assume that all marked cards are the result of heap updates. Thus a card marked as a result of a stack update will lead to the (incorrect) assumption that its corresponding heap segment was updated. However, this is acceptable, because if a given card is marked, this only serves as an indication that the corresponding segment needs further investigation for whatever purpose the card is being marked (garbage collection, etc.), for example to look for a crossheap pointer. In other words, the card table does not itself identify objects with cross-heap pointers, rather it only indicates where to look for them in an efficient manner (in those segments that have their cards marked). Thus in the above example, the incorrectly identified heap segment will be searched for a cross-heap pointer, and when none is found the program will move on, with the only impact being the (unnecessary) search of this particular segment.

Figure 6:
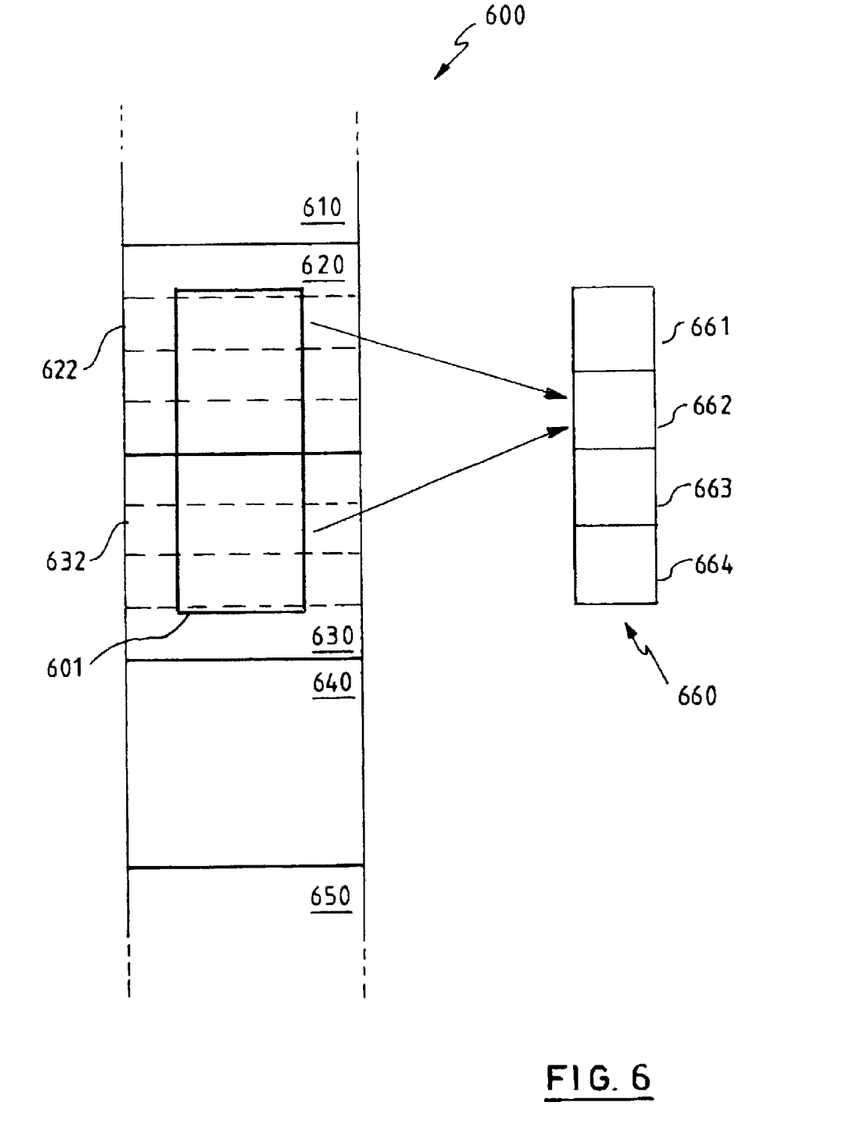

In some situations, it is possible for the heap to be larger than the fold size. One possible cause for this is that the heap size is increased during system operation to accommodate more objects. This is illustrated in FIG. 6, in which memory 600 is divided into folds 610, 620, 630, 640, and 650. It is assumed that each fold contains 4 segments, and so card table 660 contains 4 cards, 661, 662, 663, and 664. Heap 601 is illustrated as containing 6 segments, and so inevitably spans more than one fold. In this case, more than one heap segment will correspond to a single card, for example heap segments 622 and 632 both map to card 662. In these circumstances, when the card table is being reviewed, due allowance will have to be made for the fact that two heap segments can correspond to a single card. For example, if card 662 is marked, then it is necessary to scan both segments 622 and 632 for cross-heap pointers, even although only one may have been updated. It will be appreciated that this situation does not cause any processing error or mistake, but it does represent a slight loss of efficiency (scanning additional heap segments), hence the general preference for having the fold size larger than the heap size.

Note that in the example of FIG. 6, where the heap size is greater than the fold size, the reverse mapping from card to heap address of Equation (5) above will give the first (lowest) heap address corresponding to that card. The further heap address corresponding to this card can be obtained by simply adding the fold size onto the address given by Equation (5) (this can be done multiple times if the heap spans more than two folds). Clearly a final check can then be performed, as described above, to confirm that the derived address really is in the heap. For example, if a heap corresponds to one and a half folds, then adding the fold size to the mapped addresses (via Equation (5)) for the first half of the cards in the card table will produce another address in the heap, but adding the fold size to the mapped addresses for the second half of cards in the card table will produce an address beyond the heap.

Figure 7:
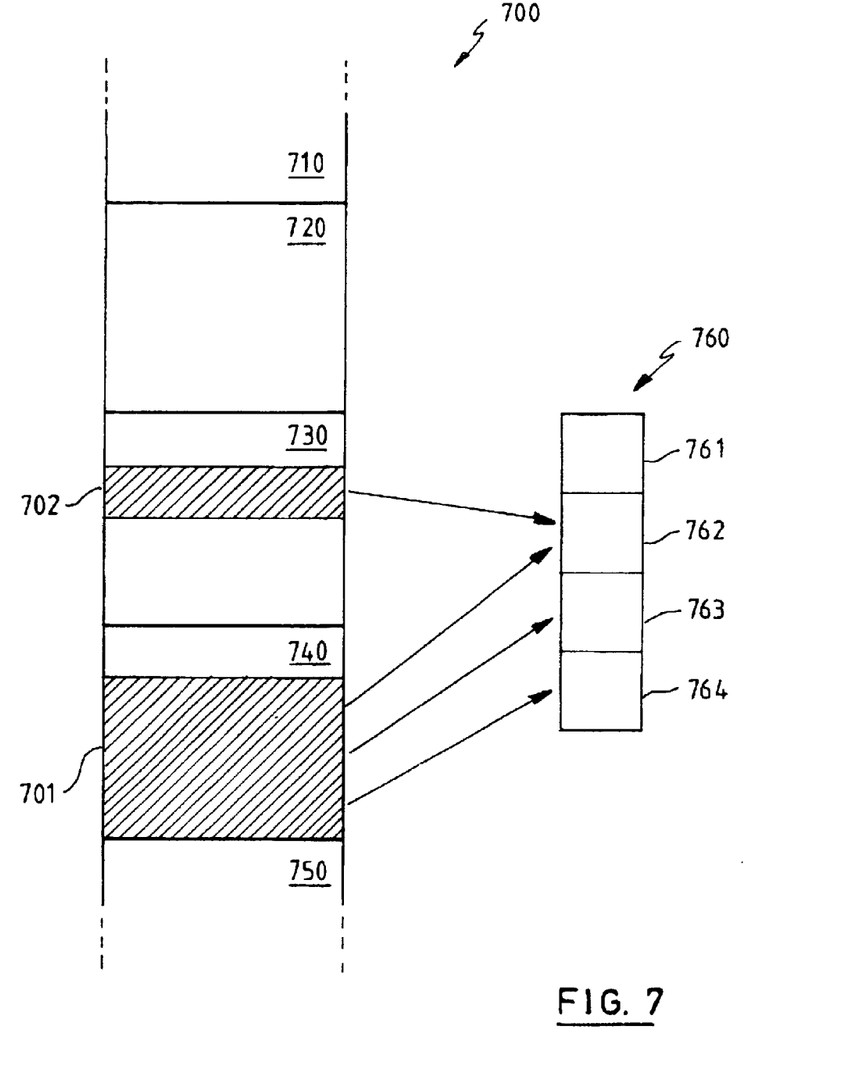
FIG. 7 illustrates the presence of a non-contiguous heap.

The heaps illustrated so far have all been formed from a single block of memory, but it is also possible for a heap to be allocated from non-contiguous memory, i.e. formed from two or more separate blocks of memory. An example of this is illustrated in FIG. 7. Here memory 700 is divided into folds 710, 720, 730, 740, 750, etc., each comprising 4 segments (not explicitly marked), which map to four cards 761, 762, 763, and 764 in card table 760. A first portion 702 of the heap comprises the second segment of fold 730, while a second portion of the heap 701 comprises the second, third and fourth segments of fold 740. Note that in this situation heap portion 702 maps to the same card as the first segment of portion 701. Consequently, it may be desirable to adjust the fold size in FIG. 7 so that a single fold accommodates both heap portions 701 and 702. This is reasonable providing the space between them is not too large (in which case a large number of cards would not be utilized).

It will be appreciated that having non-contiguous heaps leads to a wide variation of possible heap configurations, and some tuning may be required to determine the best fold size and card table size for any given configuration. Nevertheless, it should be noted that this is only an optimization issue; in other words, the underlying logic of the mapping described herein will still be effective for non-contiguous heaps.

Likewise in terms of the inverse mapping from card to heap address, the presence of non-contiguous heaps makes this slightly more complicated, but does not prevent proper operation. For example, if all the heap portions are in a single fold, then Equation (5) can be applied, using the heap base address from the lowest heap portion. The only additional check needed in this case is to ensure that the derived address really is in a heap portion, rather than in a gap in-between heap portions. An alternative approach for the inverse mapping of non-contiguous heaps is to apply Equation (5) separately for each heap portion (i.e. using the base address of each heap portion in turn), to determine cards mapping to addresses in each heap portion in turn. Again, which of these strategies is most effective will depend on the particular heap configuration, fold size, etc.

As an illustration of typical sizings of various components, in the preferred embodiment on a 31-bit system (providing 2 GBytes of memory), the segment size is 512 bytes. The default heap size is 64 Mbytes, implying that there are 128 k cards in the card table. The fold size in this situation can also be set at 64 Mbytes, implying that each card corresponds to 16 different addresses in memory (Total Memory/Number of cards). In the preferred embodiment, the heap size can also be configured by the user, from 4 Mbytes up to 1.5 GBytes. The card table and fold size should then be adjusted accordingly (note that for a 1.5 GBytes heap, the fold size would be 2 GBytes, in other words, the card table would effectively map all of memory).

It will be appreciated that there are many possible variations on the system described above. For example, the folding of memory has been such that the folds all go in the same direction, e.g. cards 0–3 correspond to heap segments: 0–3, then 4–7, then 8–11, etc. However, they could also go in alternate directions (i.e. corresponding to heap segments 0–3, then 7–4, then 8–11, etc.). Also, in the preferred embodiment, each card is a byte, but only a single bit of this is set to indicate whether or not card is dirty (the reason for this is that it is quicker to manipulate a whole byte in preferred environment than an individual bit). It is possible that the other bits in the card could be used to indicate in which particular fold the update occurred that marked the card. This would be useful, for example where there are multiple heap segments corresponding to a single card, and now only one of these (the one actually updated) would have to be scanned for a cross-heap pointer. On the other hand, this is likely to have a negative impact on the speed of the write barrier, and so may not be beneficial overall. Finally, although the invention has been described in the context of a Java environment, it will be recognised that it is not so limited, but applies to any system having a heap and card table or analogous constructs.

What is claimed is:

1. A method of operating a computer system having a memory, a portion of which is allocated to a heap for storing objects, said method comprising the steps of:

providing a card table comprising a set of N cards;

dividing the entire memory into M segments each segment having a segment size S, in which X of the M segments corresponds to the heap, where M>N and N>=X;

assigning each of the M segments to a corresponding one of said N cards, wherein at least one of said cards has multiple memory segments assigned to said card;

mapping the mth memory segment (0=>m=>M−1) to a card C where C=(m mod N)/S wherein M, N, X, C, S and m are integers; and marking a card to indicate an update to one of the one or more memory segments that correspond to the marked card.

2. The method of claim 1, wherein N and M are both powers of 2.

3. The method of claim 2, wherein the mapping from m to C is performed using only logical AND and bit shift operations.

4. The method of claim 1, wherein the heap comprises N or fewer memory segments.

5. The method of claim 1, wherein a card is only marked for an update that is potentially being made to the heap.

6. The method of claim 5, wherein the computer system further comprises a stack that is used for storing objects, and a card is only marked for an update that is made to an object on the heap or the stack.

7. The method of claim 5, wherein the card table is used as part of a garbage collection process to identify objects that have potentially been updated.

8. The method of claim 7, wherein if a marked card has multiple memory segments assigned to it, all of these memory segments are regarded as having been potentially updated.

9. The method of claim 7, wherein if a marked card has multiple memory segments assigned to it, only the ones of these memory segments that are allocated to the heap are regarded as having been potentially updated.

10. A computer system comprising:

a memory, a portion of which is allocated to a heap for storing objects, the entire memory being divided into M segments each segment having a segment size S, in which X segments correspond to the heap;

a card table comprising a set of N cards, wherein M>N and N>X, each of the M segments being assigned to a corresponding one of said N cards, so that at least one of said cards has multiple memory segments assigned to said card;

means for mapping the mth memory segment (0=>m=>M−1) to a card C where C=(m mod N)/S; wherein M, N, X, C, S and m are integers; and a write barrier for marking a card to indicate an update to one of the one or more memory segments that correspond to the marked card.

11. The system of claim 10, wherein N and M are both powers of 2.

12. The system of claim 11, wherein the mapping from m to C is performed using only logical AND and bit shift operations.

13. The system of claim 10, wherein the heap comprises N or fewer memory segments.

14. The system of claim 10, wherein a card is only marked for an update that is potentially being made to the heap.

15. The system of claim 14, further comprising a stack that is used for storing objects, and wherein a card is only marked for an update that is made to an object on the heap or the stack.

16. The system of claim 10, wherein the card table is used as part of a garbage collection process to identify objects that have potentially been updated.

17. The system of claim 16, wherein if a marked card has multiple memory segments assigned to it, all of these memory segments are regarded as having been potentially updated.

18. The system of claim 16, wherein if a marked card has multiple memory segments assigned to it, only the ones of these memory segments that are allocated to the heap are regarded as having been potentially updated.

19. A computer program product comprising program instructions encoded in a machine readable format on a storage medium, said instructions when loaded into a computer system having a memory, a portion of which is allocated to a heap for storing objects, causing the computer system to perform the steps of:

providing a card table comprising a set of N cards;

dividing the entire memory into M segments each segment having a segment size S, of which X segments represent the heap, where M>N and N>=X;

assigning each of the M segments to a corresponding one of said N cards, wherein at least one of said cards has multiple memory segments assigned to said card;

mapping the mth memory segment (0=>m=>M−1) to a card C, where C=(m mod N)/S, wherein M, N, X, C, S and m are integers; and marking a card to indicate an update to one of the one or more memory segments that correspond to the marked card.

20. The computer program product of claim 19, wherein N and M are both powers of 2.

21. The computer program product of claim 20, wherein the mapping from m to C is performed using only logical AND and bit shift operations.

22. The computer program product of claim 19, wherein the heap comprises N or fewer memory segments.

23. The computer program product of claim 19, wherein a card is only marked for an update that is potentially being made to the heap.

24. The computer program product of claim 23, wherein the computer system further comprises a stack that is used for storing objects, and a card is only marked for an update that is made to an object on the heap or the stack.

25. The computer program product of claim 23, wherein the card table is used as part of a garbage collection process to identify objects that have potentially been updated.

26. The computer program product of claim 25, wherein if a marked card has multiple memory segments assigned to it, all of these memory segments are regarded as having been potentially updated.

27. The computer program product of claim 25, wherein if a marked card has multiple memory segments assigned to it, only the ones of these memory segments that are allocated to the heap are regarded as having been potentially updated.

* * * * *